July 30, 1929.  B. F. WADDELL  1,722,485
SOUND REPRODUCING DEVICE AND METHOD FOR MAKING SAME
Filed Aug. 30, 1926  2 Sheets-Sheet 1

INVENTOR.:
Benson F. Waddell
BY
Chas. M. C. Chapman
ATTORNEYS.

July 30, 1929.  B. F. WADDELL  1,722,485
SOUND REPRODUCING DEVICE AND METHOD FOR MAKING SAME
Filed Aug. 30, 1926  2 Sheets-Sheet 2
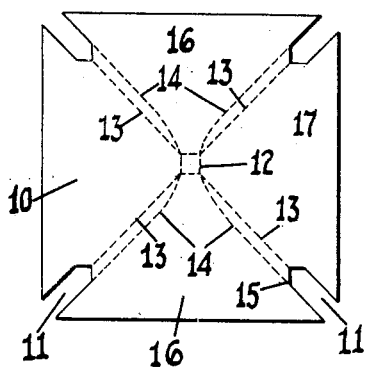
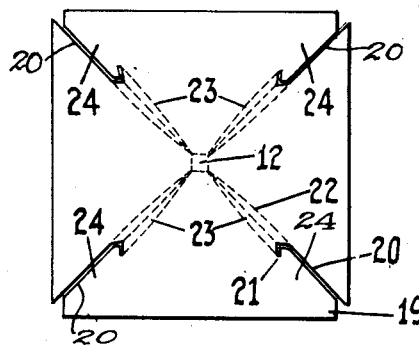
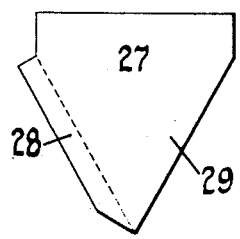
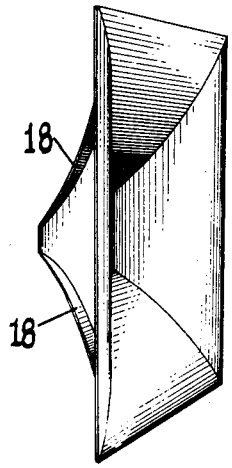
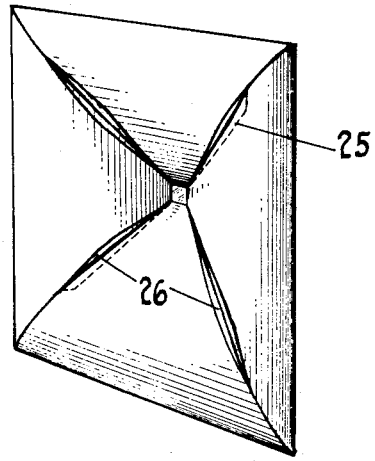
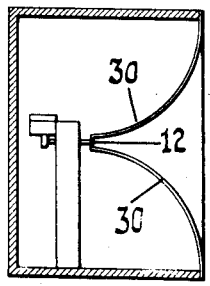
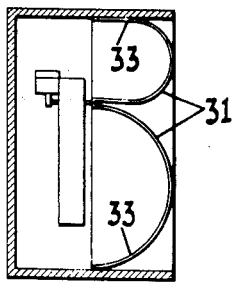
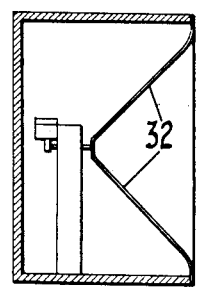
INVENTOR.:
Benson F. Waddell
BY Chas. M. C. Chapman
ATTORNEYS.

Patented July 30, 1929.

1,722,485

UNITED STATES PATENT OFFICE.

BENSON F. WADDELL, OF NEW YORK, N. Y.

SOUND-REPRODUCING DEVICE AND METHOD FOR MAKING SAME.

Application filed August 30, 1926. Serial No. 132,385.

This invention relates to the art or science of acoustics and particularly has reference to sound reproducing and amplifying devices useful in connection with various apparatus such as radio instruments, phonographs, and other talking machines, and talking moving pictures. More particularly my invention relates to membranous devices capable of reproducing, propagating, amplifying and widening the range of sound-waves and vibrations caused thereby.

It has been proposed, in sound reproducing devices, to employ a curved membrane coupled, in some manner, to a stylus connected to a vibratory member, such as an electro-magnetic telephone receiver or phonographic record, and it has been found advisable to subject the membrane to tension by curving the same and maintaining the curvature by a stress on the stylus which transmits the vibrations. By subjecting the membrane to tension, dissipation of the sound energy in its fibre, or in any slack portion thereof, is avoided, and each straight line characteristic of its curvature is caused to move bodily and without buckling throughout its entire length; but, external stress on the stylus is objectionable since it imposes mechanical resistance to the free motion thereof.

I have found that, by employing a plurality of membranes curved to the same or varying degrees, the strains of the curvatures oppose each other and the stresses are balanced without imposing additional resistance to the movements of the stylus; and this is to be distinguished from vibrations imparted to a single curved membrane, which brings out sound-waves of one amplitude propagated from only one straight line characteristic of the curvature of the membrane, while adjacent characteristics produce waves of slightly greater or less amplitudes. In order to attain maximum efficiency in sound reproduction, it is necessary that a large section of air receive waves of uniform amplitude, thereby avoiding the necessity of readjusting the wave action after it has been transmitted to the air. A single curved membrane or surface is not most efficient, since, theoretically, its lines of equal amplitude have no area, and the waves in each plane, radial to the curvature of the membrane and passing through its axis, have different amplitudes.

By using a plurality of curved membranes which are associated in approximately pyramidal relation, the lines of equal amplitude and frequency form the periphery of an area through which the sound energy is quite uniformly distributed. The vibrations from the actuating unit must be resolved tangentially to the curvature so as to produce an undulatory action throughout the diaphragm and so preclude transverse or piston-like action which would impose excessive inertia and absorb too much power. Rigidly supporting each membrane at the terminal of its curvature causes a recoil which further amplifies the undulatory wave action of the entire diaphragm. The acoustical properties of this type of diaphragm are due to the modulations in deflection caused by the action of the rolling undulations which vary the bending stress of the flexed surfaces along corresponding transverse lines. This action is, therefore, possible only when the straight line elements of each membrane are parallel, thus forming approximately cylindrical surfaces and maximum efficiency is obtained only when the corresponding elements of the respective membranes form peripheries of considerable area.

Corollary to the foregoing, objects of my invention may be noted as follows: to provide a novel diaphragm, membrane, or tympanum adapted for sound reproduction and amplification; to provide a membrane composed of fibrous material which is crisp, compact, elastic, inherently rigid, and capable of being flexed into any desired form for its functional purposes; to provide a membrane composed of a plurality of pieces, or of a single piece, of fibrous material having, approximately, pyramidal form; to provide a novel method for producing a tympanum having the characteristics noted in the foregoing; to provide a tympanum having the various novel characteristics hereinafter described and claimed; to provide a sound reproducing device comprising a plurality of membranes; to provide a device having a plurality of curved membranes of the same radii, but made of materials of different thickness; to provide a sound reproducing device having a plurality of membranes of different natural periods of vibration; to provide a loud-speaker for sound reproducing instruments having a plurality of vibrating membranes, which are constructed with different radii; to provide a loud-speaker for sound reproducing instruments having a plurality of curved membranes arranged so as to produce a horn effect; to provide a loud-speaker for sound reproducing instruments consisting of a plurality of membranes adapted to be affected by one or more motive means; to provide a sound reproducing device having a plurality of membranes arranged so as to produce no load on the stylus; to provide a speaker unit with a plurality of membranes adapted to be arranged to provide a maximum amount of surface in a minimum amount of space; to provide a membrane made of one or more pieces of crisp, inherently rigid material capable of being flexed and curved to any predetermined degree and thus rendered capable of responding to the high frequency vibrations employed in sound reproduction; to provide a process by which a sound reproducing and amplifying tympanum can be made from a single piece of material and bent, pressed or molded into predetermined form capable of functioning as required; and to provide a tympanum of the character noted in the foregoing which is capable of amplifying sound and universally distributing the same into the surrounding body of air.

With the above objects in view and others which will be set forth hereinafter, my invention consists in the parts, features, devices and combinations thereof and in the method of producing the membranous devices, as hereinafter described and claimed.

In order that my invention may be clearly understood I have provided drawings in which:

Fig. 3 is a plan view of a blank from which one form of my device is produced by my method.

Fig. 4 is a perspective view of a pyramidal membrane formed from the blank of Fig. 3;

Fig. 5 is a plan view of a blank from which another form of my device is produced by my method.

Fig. 6 is a perspective view of a pyramidal membrane formed from the blank of Fig. 5;

Fig. 7 is a plan view of a blank, from four of which another form of my device may be produced;

Fig. 8 is a sectional view, similar to Fig. 2, showing one way of placing my membrane under tension.

Fig. 9 is a view similar to Fig. 8 showing a plurality of different membranes; and Fig. 10 is a view similar to Fig. 8, showing another way of flexing and placing the membrane under tension.

Figure 1:
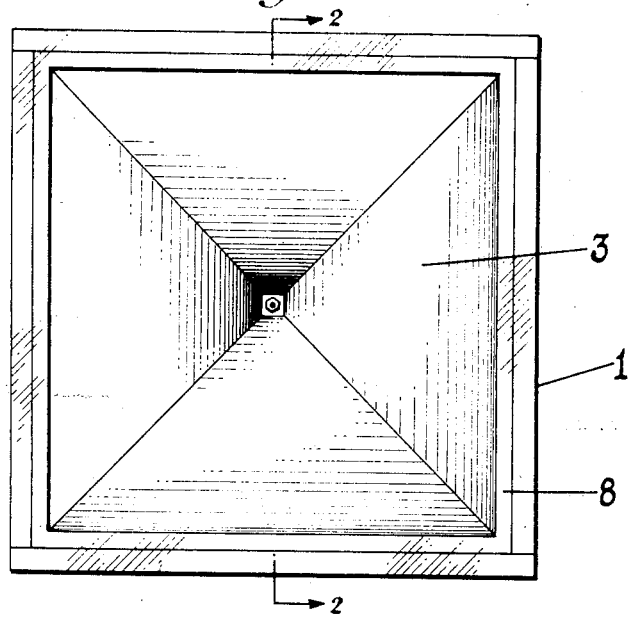
Fig. 1 is a view in front elevation of a sound reproducing and amplifying device, embodying my invention.

Referring to the drawings, the numeral 1 represents a cabinet or holder for the diaphragm or membrane; 2 the electro-magnetic unit of balanced armature type, such as a telephone receiver, or other sound reproducing device, rigidly set in the cabinet; 3 the diaphragm, tympanum, or membrane of my invention; 4 the stylus which is clamped or rigidly secured, in any suitable manner, to the membrane at its throat or truncated apex, as by clamping washers 5 and nuts threaded upon the stylus, the latter being mounted upon the armature 7 of the magnet which is free to transmit the high frequency vibrations received in well-understood manner; and 8 is a clamping frame adapted to hold the membrane flexed and under tension by clamping the surrounding margins against the mouth of the casing, preferably in a groove 9 adapted to receive the periphery of the membrane.

The casing or cabinet may be of suitable material and appropriate shape, and the unit mounted therein may be of conventional form; but, preferably, of the form of my invention disclosed in my Patent No. 1,690,147, granted Nov. 6, 1928. The clamping frame may be held to its work, in suitable manner, as by friction, or some simple mechanical means, not shown.

The membrane, according to my invention, is composed of crisp fibrous material and has a high degree of inherent rigidity, enabling it to be easily flexed and placed under tension. According to my method a single piece of suitable material is cut to the desired size and in the form of a square; is creased on predetermined lines to facilitate folding and to leave a central square stylus holder; is folded on the crease lines; is flexed or bent backwardly bodily toward its apex or central stylus holder; and is then clamped in place, around its periphery, in the mouth of the casing. These several steps can be carried out in various ways, as by simple tools; cold or hot dies, according to the characteristics of the material used, and with or without moistening the latter; or by molding and pressure. In the latter case, the ultimate form may be given in one or two manipulations.

Figure 2:
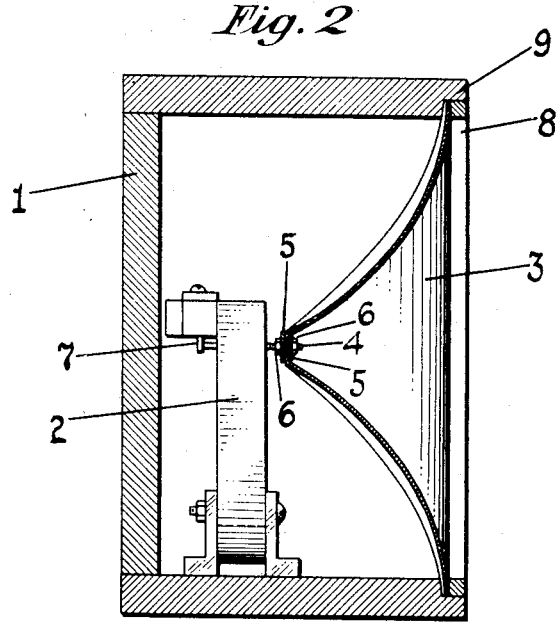
Fig. 2 is a view in vertical section of said device, on the line 2—2 of Figure 1.

Referring to Figs. 3 and 4 it will be seen that a square piece or blank 10, of the material is produced of predetermined size. The corners are deeply notched, as at 11, toward the center on diagonal lines, the throat of the notch being V-shaped. The blank is also creased or scored, to facilitate folding, so as to provide a central area in the form of a square 12, having its sides parallel with the sides, respectively, of the blank. The blank is also creased or scored along four straight radial lines 13, from the vertices of the central square to the vertices, respectively, of the notches. The blank is also scored or creased along practically straight and curved lines, the curvature of each line beginning at a vertex of the inner square and extending about one-third the length of the straight crease-line, as at 14, and then extending parallel with the latter and terminating at the extremity 15, of one leg of the V-portion of the notch at a corner of the blank. As shown in Fig. 3, the curved lines are disposed in pairs in two diametrically opposite quadrants 16, the other opposite quadrants being devoid of the crease-lines. When the blank is folded along the straight crease-lines, flexed backwardly and folded along the curved crease-lines with the material in the spaces 17, overlapped upon the plain quadrant, the device takes the approximately pyramidal form shown in Fig. 4 and is held rigidly under tension in the mouth of the casing as shown in Figs. 1 and 2. It is to be noted that the device when treated, as above stated, has four strengthening ribs, such as 18, radiating from the stylus holder 12, to the four angles which increase and reinforce the inherent rigidity of the material and prevent buckling, wrinkling, or distortion between the base or margins and apex 12, of the device. This results in enabling the entire membrane to respond with great uniformity and regularity, to the high frequency vibrations of the original source; and this without distortion, reverberation, blare, echo, recoil or other objectionable effects. In other words, the ability of the membrane to respond uniformly throughout its area, to the high frequency vibrations, enables it to reproduce with exceeding purity and accuracy all kinds and quality of sound vibration. These results are due partly to the mode of hanging or supporting the membrane by its periphery, or marginal edges, and allowing its body and stylus carrying apex to freely swing or float in unconfined air, subject to the differential action of the variant characteristics of instrumental, vocal and other sound vibrations of high frequency. The results mentioned are also due in part to the characteristics of the membrane as a whole including its mode of construction, its continuity of form, its uniformity of thickness, density, surface, universal directional flare, crispness, flexibility and curvature. Which of these various characteristics is most important, for sound reproduction in original purity, cannot be determined with accuracy; but, I believe, from experimentations, that the universal flare of the membrane, its continuity, and its mode of support in free air, are all potent factors in enabling it to reproduce and amplify the sound vibrations in original purity. The area and location of the stylus support, table, or apex 12, are also important factors in my invention, since the support is intervened between the walls of the membrane and provides for amplitude of distribution of the vibration, preventing recoil, echo and reverberation. When the sheet of Figure 3 is folded, as described, and flexed preparatory to securing it in place, as in Fig. 4, the curved fold lines 14, lie snugly against the surfaces of the membrane, adding rigidity, while the curvature given the membrane holds the curved fold snugly in place.

In the form of my invention shown in Figures 5 and 6, the blank is treated to produce a central stylus-holder or support 12, corner V-shaped notches 19, straight slits 20, from the vertex of the notches terminating in V-shaped slits 21, radial straight line creases 22, and curved line creases 23, extending from the angles of the stylus support to the several angles, respectively, of the slits. When the blank, thus prepared, is folded on its crease-lines, and flexed rearwardly toward its apex 12, the wings 24, produced by the slits, naturally extend under the adjacent quadrant and are utilized to secure the membrane under tension in its flexed position. Thus the proper curvature is given the membrane, strengthening ribs 25, are produced, which add to the natural or inherent rigidity of the material used. The longitudinal depressions 26, result naturally from the mode of treatment of the material in the production of the membrane and continuity of material is obtained.

Both forms of my membrane, of Figs. 4 and 6, can be produced by molds, heat and pressure at one operation; and in treating certain materials it may be expedient to use moisture, which may be in the form of steam or a fine spray.

While I have shown in Figs. 1 to 6 a form of diaphragm composed of a single sheet, or blank, of suitable material, I desire it understood that I may produce an efficient diaphragm from a plurality of pieces 27, of material such as shown in Fig. 7, wherein a quadrant is formed with a lateral, diagonal wing or flap 28, which is utilized to secure the quadrant to a similar piece by gluing the wing to the diagonal margin 29, of a similar blank. This will produce a membrane which is homogeneous and continuous throughout its area. When flexed and held under tension such a membrane will closely resemble, in superficial appearance, the diaphragm shown in Figure 4.

Other forms of my invention are shown in Figs. 8 to 10, Figure 8 portraying a membrane composed of either one or two pieces 30, of suitable material; if of two pieces the stylus support will be formed by bending the adjacent edges at a right-angle and gluing or otherwise securing the wings together. The membrane is flexed and held under tension in the casing in the manner described with reference to the other forms of my invention.

Fig. 9 shows another form of my invention wherein a membrane formed of one or two pieces 31, is flexed to provide differential curvatures, or arcs of circles struck from different centers. This form will take care of sound vibrations of wide variations, and of differential vibrations transmitted to the membrane simultaneously.

The form of Fig. 10 is composed of one or two pieces 32, of material; but its curvature is confined to the marginal edges of the membrane, the body of the membrane being straight. In the forms of Figs. 9 and 10 the stylus support is produced as described with reference to Fig. 8. In the form of Fig. 9 the margins 33, are secured to the sides of the casing by gluing or by mechanical means.

The importance of my invention can be appreciated when it is understood that, in actual practice, it has been found impossible to cover the desired frequency range by the use of the best sound reproducing devices available for radio loud-speakers, public-address speakers, phonographs, and other loud-speakers, and that it has been found practically impossible to embody in a single instrument a vibrating membrane or tympanum capable of covering the range of frequencies ordinarily encountered. The employment of a plurality of membranes, or a membrane of polyphase characteristics, such as is included in my invention herein disclosed and hereinafter claimed, enables the apparatus to cover the widest range of frequencies which may be, or usually are, encountered in any known use of loud speaking apparatus, such as radio apparatus and horns, phonographs and horns, public-address apparatus, and talking motion picture apparatus and systems, and regardless of the motive means employed.

It is also to be understood that, in the production of any device, I may give to my membrane curvatures of different radii, and may employ materials of varying thickness, or of different thickness. It is also within the contemplation of my invention to employ a plurality of curved membranes, in making up a device such as shown in Figures 4 and 6, although I prefer to produce the same from a single blank as described. While the preferred form of my membrane is produced from a single blank or sheet of material, the effect is that of a plurality of triangular sections or pieces, assembled with their apices surrounding a rectangular support for the stylus, and with their cooperating edges in abutted relation, substantially as shown in Figures 4 to 10. Another feature of importance in my invention is the mode of connection of the armature, stylus and membrane. This connection is direct, positive, and rigid; it is a connection which transmits the vibrations directly, positively and without loss, change or modification to the membrane.

In this connection I desire to lay stress of importance upon the mode of supporting my membrane; that is to say, the entire periphery or outer margin is clamped by the casing and frame 8, and is thereby positively held so that it is supported practically rigidly in the casing. This mode of supporting the membrane causes the latter to recoil and respond universally to an exceedingly wide range of vibrations, and in effect causes the apex of the membrane to float in unconfined and free air. However, the connection of the membrane at its apex directly to the stylus and indirectly to the armature is equivalent to, and is in effect, an additional support for the membrane at the nearest point possible to the source of high frequency vibration, with the result that the distribution of the high frequency vibrations to the membrane is uniform, universal, and poly-directional, and is through the medium of positive connections as distinguished from loose linkage, or multiform leverage. Moreover, the attack of the vibrations is tangential to the membrane, or in the plane thereof.

While the specific means for connecting the stylus to the membrane at its apex, shown in Fig. 2, is satisfactory and admits of quick assembly and dismantling of the device, I may make the connection by fixing a ferrule or sleeve in the apex and soldering the stylus therein or thereto. This makes a very rigid and therefore desirable connection which cannot be affected by vibration, and admits of no loss of effects between the membrane and original source of vibrations.

Having thus described my invention, what I claim and desire to secure by Letters Patent is:

1. In a sound reproducing device the combination of a plurality of membranes of different natural vibratory periods, each having at least one edge adjacent an edge of the others, and means for imparting vibrations thereto attached to the apex of said membranes.

2. In a sound reproducing device the combination of a plurality of membranes of different natural vibratory periods, each having at least one edge adjacent an edge of the others, and means for imparting tangential vibrations thereto attached to the said membranes.

3. A sound reproducing membrane composed of a sheet of flexed material having its corners notched and crease-lines imposed upon its surface.

4. A sound reproducing membrane composed of a piece of flexed material having its corners notched and its body creased on crossed diagonal lines terminating at the notches.

5. A loud-speaker diaphragm composed of a sinkle sheet of flexible material and having the form of a truncated pyramid provided with curved sides, said diaphragm having radial stiffening ribs.

6. A loud-speaker diaphragm composed of a single sheet of flexible material, and having a plurality of curved trapezoidal body sections at an angle to each other, and a flat apex joining the sections at one end thereof.

7. A loud-speaker diaphragm having a pyramidal body provided with curved sides terminating at a truncated apex.

8. A loud-speaker diaphragm having a pyramidal body with curved sides and a truncated apex, said body having radial ribs, each in the form of two circular segments having a common chord.

9. In a sound reproducing device the combination of a plurality of approximately triangular curved membranes arranged with edges adjacent but separated by folds, means for connecting the membranes together, and means for imparting vibrations to said connecting means so as to cause said membranes to receive tangential vibrations.

10. The method of making a sound reproducing membrane from flexible material, comprising creasing the surface of said material, folding the material on the crease lines, and flexing the folded material normally to its surface to place it under tension.

11. A sound reproducing membrane having its center depressed, means for stiffening a considerable area of the central portion in at least two directions, and the outward portion forming a series of approximately cylindrical flexible sections.

12. A sound reproducing device comprising a membrane having a ribbed central portion surrounded by a series of flexible cylindrical surfaces, a supporting structure, and a vibration producing means attached to said central portion.

13. The method of making a loud-speaker diaphragm from a flat sheet of material, comprising subjecting the sheet to pressure to produce a plurality of curved surfaces and simultaneously folding the excess material so as to avoid compressing, stretching or buckling the material.

14. The method of making a loud-speaker diaphragm comprising folding a sheet of material to produce a plurality of curved surfaces and simultaneously form the material of the sheet into radial strengthening ribs.

15. A sound reproducing diaphragm having an approximately pyramidal body with curved sides and radial ribs in the form of segments with a common chord.

16. A sound reproducing membrane composed of a piece of flexible paper having a general pyramidal form and bodily curvatures.

17. In a sound reproducing device the combination with a plurality of membranes associated integrally in pyramidal relation, and having their body portions flexed to produce tension, of means for transmitting vibrations along the planes of said membranes.

18. In a sound reproducing device the combination with a plurality of curved trapezoidal membranes connected in pyramidal form, and having vertices joined and flattened.

19. In a sound reproducing device the combination with a plurality of curved membranes connected in pyramidal relation, and having vertices joined and flattened, of means for transmitting vibrations tangentially to said membranes.

20. A sound reproducing device comprising a plurality of stressed membranes associated integrally in pyramidal relation, and a sound actuating member attached to the common edges thereof.

21. In a sound reproducing device, the combination of a plurality of stressed membranes associated to have a common apex and abutting edges, and means for imparting vibrations thereto.

22. In a sound reproducing device, the combination of a plurality of curved trapezoidal membranes associated to have a common apex and having abutting edges, and means for imparting tangential vibrations thereto.

23. In a sound reproducing device the combination of a plurality of curved membranes having abutting edges and associated in pyramidal relation, a vibration transmitting element common to said membranes, and means for imparting vibrations to said element.

24. In a sound reproducing device, the combination of a plurality of curved trapezoidal membranes having abutting edges and connected in pyramidal relation, a vibration transmitting element common to said membranes, and means for imparting vibrations to said element.

25. A sound reproducing device comprising a plurality of membranes associated integrally in pyramidal relation, and a sound actuating member attached tangentially to the membranes to impart vibrations thereto, each membrane being driven by said sound actuating member.

26. A sound reproducing device comprising a plurality of flexed trapezoidal membranes having an integral apex and means for vibrating the structure.

27. A sound reproducing device comprising a plurality of curved trapezoidal membranes, fixedly joined at adjacent edges thereof, and a sound actuating member attached tangentially to the membranes.

28. A sound reproducing device comprising a plurality of flexed trapezoidal membranes, each being fixed at one edge thereof, and arranged so that all the membranes have one edge integrally joined to an edge of each one of the other membranes, and a sound actuating member attached tangentially to the joined edges of the membranes.

29. A sound reproducing device comprising a plurality of curved membranes joined by folds in pyramidal relation to have a common apex, and a sound actuating member attached to said apex.

30. A sound reproducing device comprising a plurality of flexed trapezoidal membranes integrally joined, a sound actuating member attached to said joined edges, and a frame for supporting said membranes and said sound actuating member.

31. A sound reproducing membrane composed of a piece of flexible material of truncated pyramidal form having curved sides and a stylus secured to its truncated portion.

32. A sound reproducing membrane composed of a plurality of approximately triangular sections of flexible fibrous material, and having a centrally located rigid portion surrounded by the flexible sections.

33. A sound reproducing device comprising a supporting frame, a flared membrane of general pyramidal form, and means for rigidly supporting said membrane in the frame around its marginal edges with its central portion afloat.

34. A sound reproducing device comprising a supporting casing, a flared membrane of general pyramidal form mounted within the casing, means for rigidly securing the membrane around its margin to an open side of the casing, said membrane having a central portion afloat within the casing.

35. A sound reproducing device having in combination an inclosing casing open at one side, a flared membrane supported within the casing with its flared portion outwardly toward the said open side, an actuating unit supported within the casing, and a stylus secured to the membrane within the casing and connected with the unit.

36. A sound reproducing device including in combination a supporting casing having one side open, an actuating unit mounted in the casing, a flared pyramidal membrane having a central rigid portion and mounted in the casing with its open side toward the open side of the casing, and a stylus mounted on the said rigid portion of the membrane and operatively connected to the said unit.

37. A sound reproducing device having, in combination, a supporting casing, a stressed pyramidal membrane mounted within the casing at the front thereof, an actuating unit mounted within the casing and connected to the membrane.

38. A sound reproducing device having in combination a supporting casing, a stressed membrane of general pyramidal form mounted within the casing at the front thereof, an actuating unit mounted within the casing in rear of the membrane, and vibratorily connected thereto.

39. A sound reproducing device comprising a membrane of pyramidal form, and a vibration producing means attached to the apex of the membrane to receive vibrations along the planes of the membranes, whereby the resultant vibrations are in the planes of the membrane.

40. A sound reproducing device comprising a membrane of approximately pyramidal form having curved sides, and a vibration producing means attached to the apex of the membrane to resolve vibrations tangentially to the membrane.

41. A sound reproducing device comprising a membrane of pyramidal form with its sides flared into curved surfaces, and a vibration producing means attached to the apex of the membrane to resolve vibrations tangentially to the curved surfaces of the latter.

42. A sound reproducing membrane which is depressed in the center so as to form a plurality of curved trapezoidal surfaces whose respective straight line elements are parallel.

43. The method of producing an approximately pyramidal diaphragm from a flat sheet of material, comprising imposing radial creases upon the sheet, folding the sheet along the crease lines, and flexing the sheet on the fold lines.

44. A sound reproducing diaphragm composed of fibrous material having the form of a pyramid with an integral truncated apex, the latter being comparatively rigid for attachment of a stylus.

45. A sound reproducing diaphragm composed of fibrous material having the form of a pyramid with its sides flared and curved in a plurality of angular directions, and having a flattened apex, in combination with a stylus fixed to the apex normal to its surface.

46. The method of making an acoustical diaphragm comprising cutting material into approximately trapezoidal sections with curved sides, rigidly joining the curved sides to produce a plurality of curved surfaces, and reenforcing a portion of the material to provide a location for a stylus holder.

47. An acoustic device comprising a diaphragm of pyramidal formation, and a truss extending outwardly from the apex of said diaphragm to a point short of the outer edge thereof.

48. An acoustic device comprising a diaphragm of pyramidal formation, and a truss extending outwardly from the apex of said diaphragm to a point short of the outer edge thereof, the diaphragm between the outer end of the truss and the outer edge thereof having a greater degree of flexibility than the remainder of the diaphragm.

49. An acoustic device comprising a diaphragm of pyramidal formation, and a truss extending outwardly from the apex of said diaphragm to a point short of the outer edge thereof, said truss including angularly disposed sides which constantly vary in width throughout the length of the truss.

50. An acoustic device comprising a diaphragm of pyramidal formation, and a truss extending outwardly from the apex of said diaphragm to a point short of the outer edge thereof, said truss including angularly disposed sides which constantly vary in width throughout the length of the truss with the greatest width of said sides being at a point intermediate the ends of the truss and the width then decreasing toward each end.

51. An acoustic device comprising a diaphragm of pyramidal formation with the material of the diaphragm adjacent the diverging edges of the lateral faces thereof being shaped to form reinforcing trusses, the portions of each face between adjacent trusses being curved on a line extending from the apex of the diaphragm toward the outer edge forming said face and being flat in any plane parallel to said edge.

52. An acoustic device including a pyramidal diaphragm, means thereon for attaching a vibration transmission unit thereto, and a plurality of reinforcing trusses projecting laterally from a face of the diaphragm and radiating from the point of attachment of said unit to said diaphragm, and extending to a point short of the outer edges of the diaphragm, the portion of said diaphragm between the outer ends of the trusses and the outer edges of the diaphragm having a greater degree of flexibility than the remainder of the diaphragm.

53. An acoustic device including a pyramidal diaphragm having an apex, a plurality of trusses radiating from said apex and terminating short of the outer edges of said diaphragm, and a mounting to which the outer edges of the diaphragm are rigidly secured.

54. An acoustic device including a diaphragm of pyramidal formation, reinforcing trusses struck up from the surface of said diaphragm and diverging from the apex thereof, and a mounting to which the free edges of the diaphragm are rigidly secured, said trusses terminating short of said mounting to provide an area between the same of greater flexibility than the remaining portion of said diaphragm.

55. An acoustic device including a diaphragm of pyramidal formation having parabolic faces, trusses formed from the material of said diaphragm to increase the rigidity thereof over the area of said faces located between the trusses, and a mounting to which the free edges of said diaphragm are secured, there being an area between said trusses and mounting of greater flexibility than the first named area.

56. A diaphragm for acoustic devices formed from a single sheet of flexible material, a certain area of which on opposite sides of a radial line extending from the center of the sheet is defined by curved intersecting lines, and the material being bent along said radial and intersecting lines to form a reinforcing truss projecting from the remaining area of said diaphragm.

57. A diaphragm for acoustic device formed from a single rectangular sheet of flexible material, a certain area of which on opposite sides of a radial line extending from the center of the sheet is defined by curved intersecting lines, and the material being bent along said radial and intersecting lines to form a reinforcing truss projecting from the remaining area of said diaphragm, and a mounting constituting a supporting frame for the diaphragm, to which the outer edges of the latter are secured.

58. A diaphragm for acoustic devices formed from a single rectangular sheet of flexible material having a plurality of areas defined by a number of pairs of curved intersecting lines with the lines of each pair arranged on opposite sides of a radial line extending from the center of the sheet, the material of said sheet being bent along said intersecting and radial lines to shape the diaphragm into pyramidal form with curved lateral faces and to provide a plurality of reinforcing trusses for the diaphragm.

59. A diaphragm for acoustic devices formed from a single rectangular sheet of flexible material having a plurality of areas defined by a number of pairs of curved intersecting lines with the lines of each pair arranged on opposite sides of a radial line extending from the center of the sheet, the material of said sheet being bent along said intersecting and radial lines to shape the diaphragm into pyramidal form with curved lateral faces and to provide a plurality of reinforcing trusses for the diaphragm, and a mounting for the outer edges of said diaphragm of greater rigidity than the same.

60. A diaphragm for acoustic devices formed from a single rectangular sheet of flexible material having a plurality of areas defined by a number of pairs of curved intersecting lines with the lines of each pair arranged on opposite sides of a radial line extending from the center of the sheet, the material of said sheet being bent along said intersecting and radial lines to shape the diaphragm into pyramidal form with curved lateral faces and to provide a plurality of reinforcing trusses for the diaphragm, and a mounting for the outer edges of said diaphragm of greater rigidity than the same, the outer ends of said trusses terminating short of said mounting to provide an area of greater flexibility than the remaining portion of the diaphragm.

BENSON F. WADDELL.